(12) United States Patent
Belgard

(10) Patent No.: US 7,178,252 B1
(45) Date of Patent: Feb. 20, 2007

(54) PIPE FITTING ALIGNING DEVICE

(75) Inventor: Jimmie D. Belgard, Deville, LA (US)

(73) Assignee: Advanced Designs, L.L.C., Deville, LA (US)

( * ) Notice: Subject to any disclaimer, the term of this patent is extended or adjusted under 35 U.S.C. 154(b) by 28 days.

(21) Appl. No.: 10/981,259

(22) Filed: Nov. 4, 2004

Related U.S. Application Data

(60) Provisional application No. 60/517,472, filed on Nov. 5, 2003.

(51) Int. Cl.
*G01B 1/00* (2006.01)

(52) U.S. Cl. .............................. 33/412; 33/529; 33/472

(58) Field of Classification Search ................. 33/412, 33/529, 474–475, 464–465, 471–473
See application file for complete search history.

(56) References Cited

U.S. PATENT DOCUMENTS

| | | | |
|---|---|---|---|
| 3,245,201 A | | 4/1966 | Richardson |
| 3,670,418 A | | 6/1972 | Hamilton, Jr. |
| 4,375,724 A | * | 3/1983 | Brock .......................... 33/529 |
| 4,380,872 A | * | 4/1983 | Moran ......................... 33/529 |
| 4,388,765 A | | 6/1983 | Dearman |
| 4,497,119 A | | 2/1985 | Dearman |
| 4,914,825 A | * | 4/1990 | Howard ........................ 33/464 |
| 6,505,412 B2 | | 1/2003 | Hauzie, Jr. |
| 6,622,395 B1 | * | 9/2003 | Hickey ......................... 33/529 |
| 2002/0178597 A1 | * | 12/2002 | Todd ............................ 33/484 |

* cited by examiner

*Primary Examiner*—Yaritza Guadalupe-McCall
(74) *Attorney, Agent, or Firm*—Jones, Walker, Waechter, Poitevent, Carrere, & Denegre, L.L.P.

(57) ABSTRACT

A pipe fitting aligning device having at least one square block assembly slidably positioned on a reference tool. The square block assembly includes a slot with a vertical scale extending therefrom. The device may include at least one compass assembly slidably positioned on the reference tool and spaced apart from the square block assembly.

20 Claims, 14 Drawing Sheets

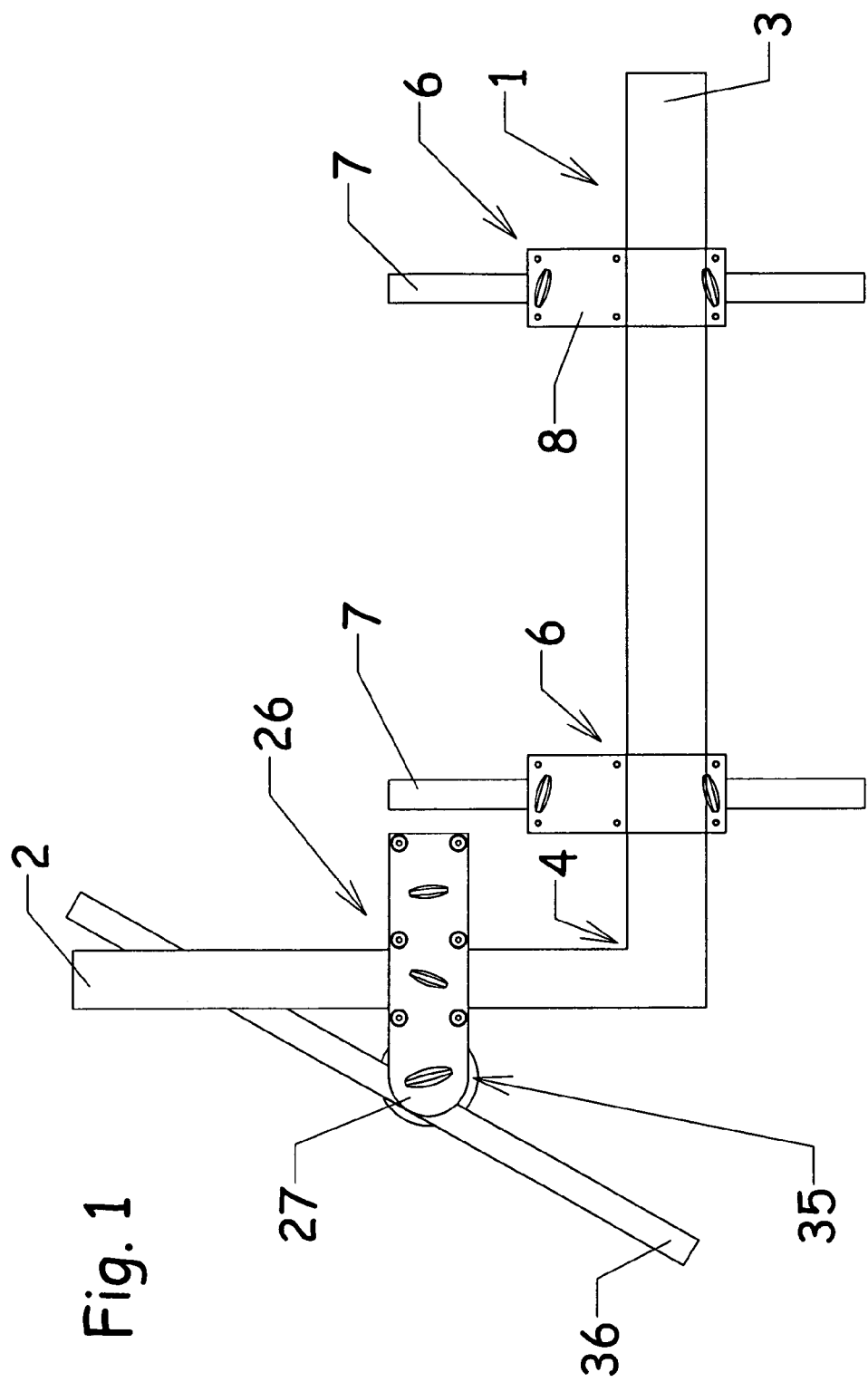

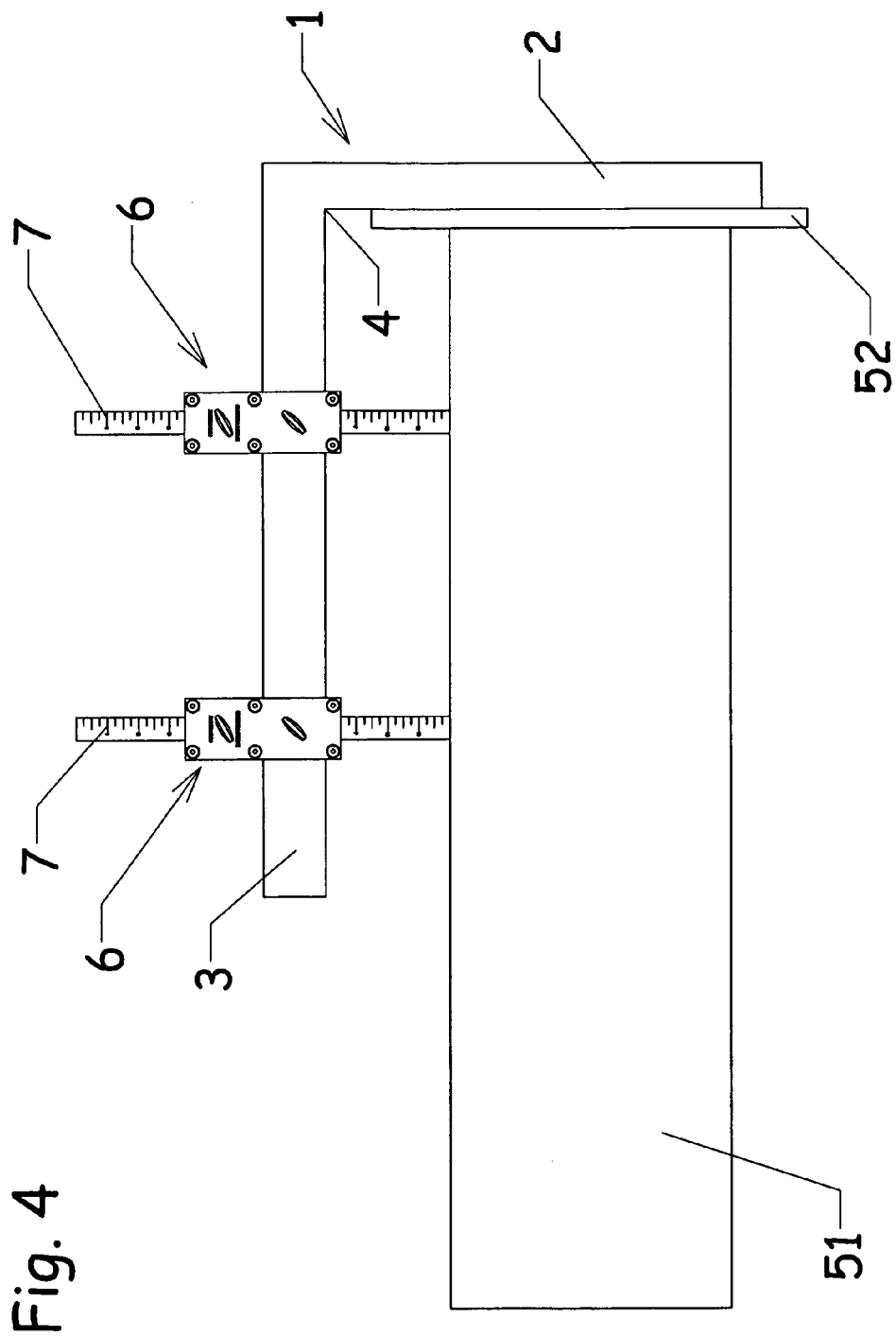

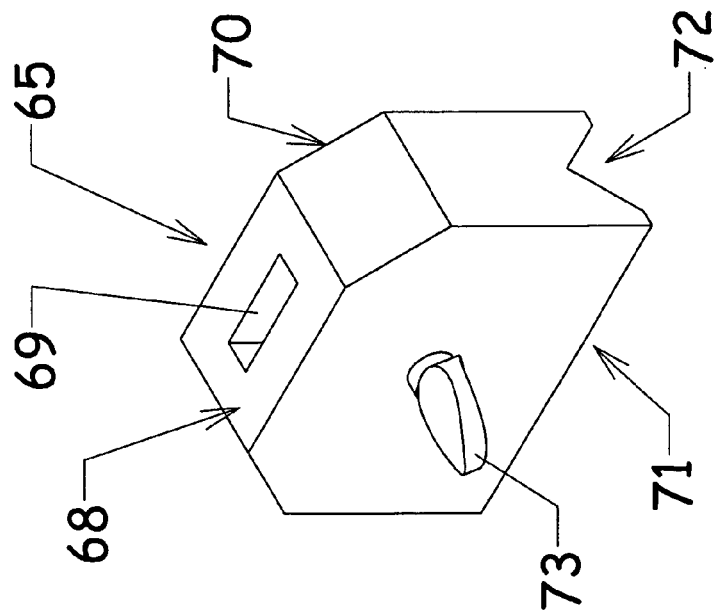
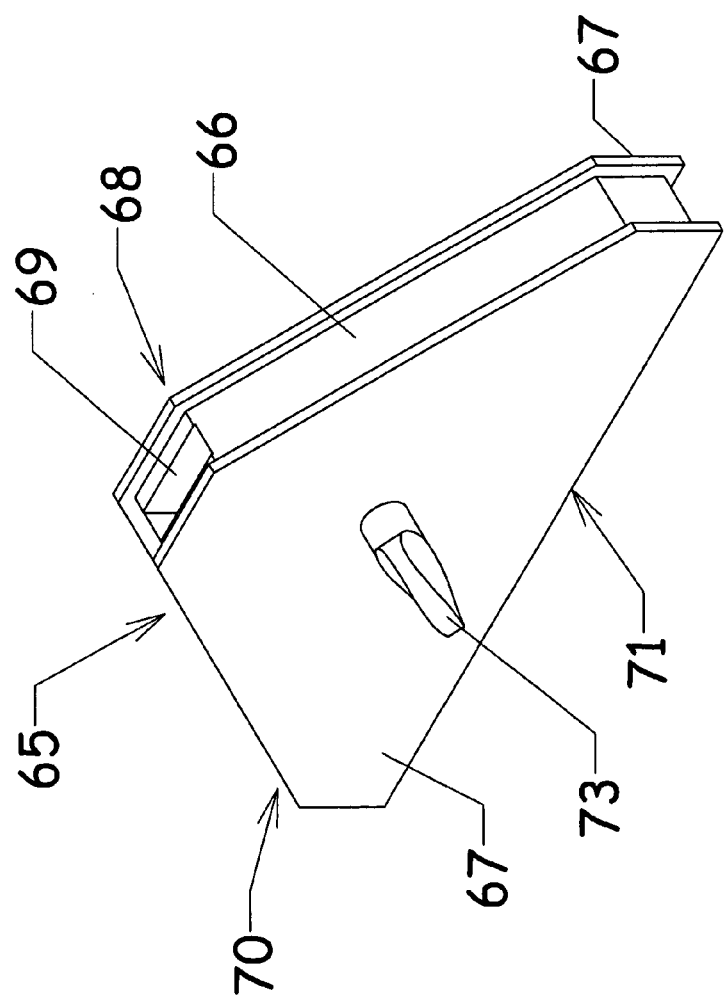
Fig. 13a
Fig. 13b

PIPE FITTING ALIGNING DEVICE

This application claims priority to U.S. Provisional Application No. 60/517,472 filed on Nov. 5, 2003, which is hereby incorporated by reference in its entirety.

FIELD OF INVENTION

The present invention relates to aligning devices for the alignment pipes and fittings and for making measurements regarding the same.

BRIEF DESCRIPTION OF THE DRAWINGS

FIG. 1 is a diagram of one embodiment of the aligning device.

FIG. 2b is a side view of the embodiment shown in FIG. 2a.

FIG. 2c is a back view of the embodiment shown in FIG. 2a.

FIG. 2d is an exploded view of the embodiment shown in FIG. 2a.

FIG. 3b is a side view of the embodiment shown in FIG. 3a.

FIG. 3c is a front view of the embodiment shown in FIG. 3a.

FIG. 3d is an exploded view of the embodiment shown in FIG. 3a.

FIG. 4 illustrates one embodiment of the aligning device positioned on a pipe.

FIG. 13a is a perspective view of an embodiment of a base assembly.

FIG. 13b is a perspective view of another embodiment of a base assembly.

DETAILED WRITTEN DESCRIPTION

Figure 2A:
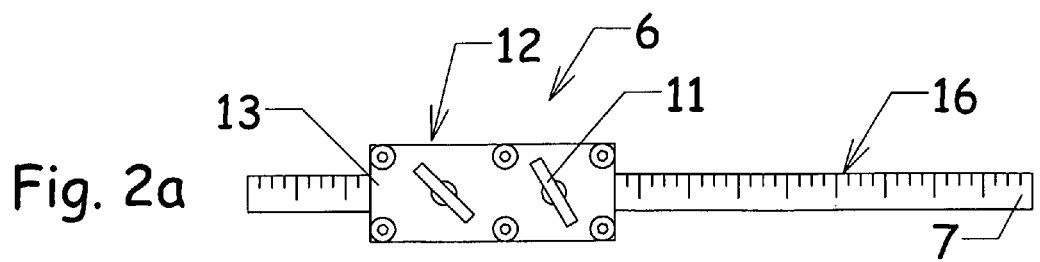
FIG. 2a is a front view of one embodiment of the square block assembly.
Figure 2B:
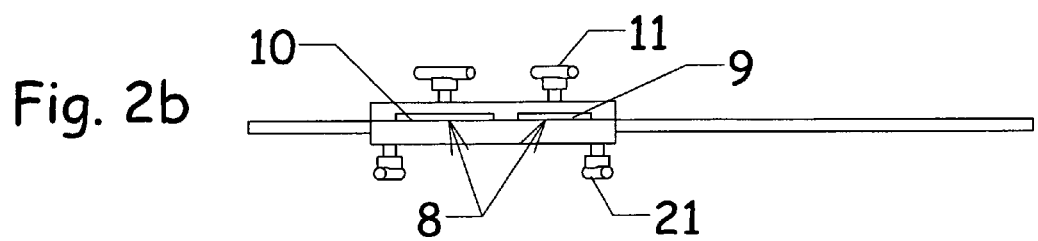

FIG. 1 illustrates an aligning device comprising a combination of square block assemblies 6 and compass assembly 26 positioned on a reference tool. A reference tool includes, without limitation, framing squares, meter sticks, yard sticks, etc. Likewise, the term "square block assembly" includes not only square or rectangular blocks, but also elongated blocks of other shapes (e.g. elliptically shaped). The reference tool depicted in FIG. 1 is a framing square 1.

Framing squares are well known within the art and are commonly used by builders to square joints such as door and window frames. Framing squares are typically L-shaped and characterized by one 90 degree angle. Some framing squares have sides with different widths. For example, for some framing squares the width of the vertical leg of the "L" will be wider than the width of the horizontal leg of the "L". A typical framing square 1 is depicted in FIG. 1. As illustrated, framing square 1 is characterized by narrow side 2 and wide side 3. Narrow side 2 and wide side 3 are joined together at right angle 4. As used herein, "vertical" generally refers to the dimension along the length of square block assembly 6, while "horizontal" generally refers to the dimension across the width of the block.

As best seen in FIGS. 2a–2d, the illustrated embodiment of the square block assembly 6 is adaptable for slidably engaging framing square 1 and includes the basic elements of a body 12 and a vertical scale 7. A body 12 is defined as any type of housing capable of slidably engaging a reference tool and having a vertical scale slidably connected thereto.

Figure 2C:
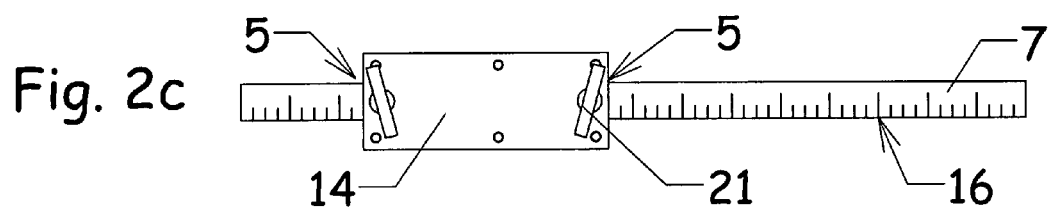
Figure 2D:
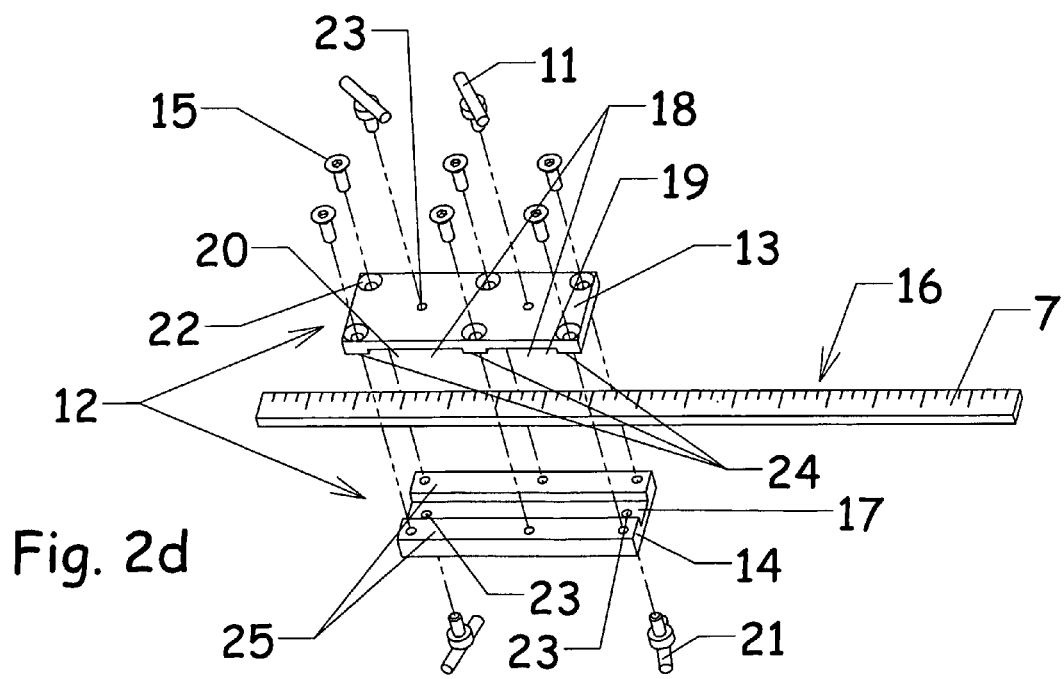

In the square block assembly 6 illustrated in FIG. 2d, body 12 has a two piece construction. Body 12 comprises front plate 13 and back plate 14. Front plate 13 includes three horizontally positioned rails 24. The spaces between horizontal rails 24 define two horizontal channels 18. The illustrated embodiment includes narrow horizontal channel 19 and wide horizontal channel 20. Narrow horizontal channel 19 is sized so that the narrow side 2 of framing square 1 (shown on FIG. 1) can slide within narrow horizontal channel 19. Wide horizontal channel 20 is sized so that the wide side 3 of framing square 1 (shown on FIG. 1) can slide within wide horizontal channel 20. Back plate 14 includes two vertical rails 25 with the space between vertical rails 25 defining vertical channel 17. Vertical channel 17 is sized so that vertical scale 7 can slide within vertical channel 17. In the illustrated embodiment, front plate 13 and back plate 14 are fabricated from extruded aluminum. In addition, horizontal channels 18 and vertical channel 17 are created by machining the extruded aluminum. Other embodiments of square block assembly 6 may be fabricated from conventional materials other than extruded aluminum. For example, in an alternate embodiment of square block assembly 6, body 12 may be formed through a conventional injection molding process wherein a mold is first created for body 12 and material is then injected into the mold to form body 12.

In assembling square block assembly 6, vertical scale 7 is positioned in vertical channel 17 of back plate 14. Front plate 13 and back plate 14 are then connected together using screws 15 inserted through screw holes 22. Naturally, bolts, rivets, welding or other attachment means could be used in place of screws 15. When front plate 13 and back plate 14 are connected together, horizontal rails 24 are positioned across and perpendicular to vertical channel 17, thereby causing vertical scale 7 to be enclosed within vertical channel 17. Positioning front plate 13 and back plate 14 together transforms vertical channel 17 into vertical slot 5 (shown in FIG. 2c). A "slot" is defined as a passage which extends from one side of body 12 to the opposite side of body 12 and has open ends. Therefore vertical slot 5 is an open passage extending vertically from one side of body 12 to the opposite side of body 12 and is designed to accommodate vertical scale 7. Also when front plate 13 and back plate 14 are positioned together, vertical rails 25 are positioned across and perpendicular to horizontal channels 18, thereby transforming horizontal channels 18 into horizontal slots 8.

Vertical scale 7 is capable of sliding vertically up and down within vertical slot 5. Positioner holes 23 are located on back plate 14 above vertical channel 17. Vertical positioners 21 extend through positioner holes 23 and are designed to engage vertical scale 7. Vertical positioners 21 are capable of fixing the position of vertical scale 7 relative to vertical slot 5 such that vertical scale 7 is prevented from sliding within vertical slot 5. To fix the position of vertical scale 7, vertical positioners 21 are forced into contact with vertical scale 7, thereby causing vertical 7 to come into contact with the inner wall of vertical slot 5. The constant application of force from vertical positioners 21 on vertical scale 7, coupled with the friction between vertical scale 7 and the inner wall of vertical slot 5 prevents vertical scale 7 from sliding relative to vertical slot 5. FIG. 2c illustrates the underside of body 12 showing back plate 14. As depicted, vertical positioners 21 are located directly above vertical slot 5. Vertical positioners 21 may include any conventional means of applying force to vertical scale 7. In the illustrated embodiment, vertical positioners are thumb screws which threadedly engage positioner holes 23.

As shown in FIGS. 2a through 2d, vertical scale 7 is a ruler-like, planar object. Markings 16 provide a reference when adjusting the height of vertical scale 7. In the illustrated embodiment, markings 16 follow a standardized numerical measuring system such as inches or centimeters. However, markings 16 may simply be lines, marks, etc. not associated with any numbers. In the illustrated embodiment, vertical scale 7 is comprised of one-fourth inch aluminum flat bar. However, other embodiments of vertical scale 7 may include different conventional materials such as wood, steel, plastic, etc. Further, other embodiments of square block assembly 6 may be designed to accommodate a vertical scale 7 having a different shaped cross section such as tubular or triangular.

As mentioned above, square block assembly 6 is designed to be positioned on framing square 1 (shown in FIG. 1) such that framing square 1 slidably engages square block assembly 6 through horizontal slots 8. Narrow horizontal slot 9 (FIG. 2b) is sized such that narrow side 2 of framing square 1 can slide in and out of narrow horizontal slot 9. Wide horizontal slot 10 is sized such that wide side 3 of framing square 1 can slide in and out of wide horizontal slot 10.

Viewing FIG. 2d, positioner holes 23 are located on front plate 13 above horizontal slots 8. Horizontal positioners 11 extend through positioner holes 23 and are designed to engage framing square 1. Horizontal positioners 11 are capable of fixing the position of framing square 1 relative to horizontal slot 8 such that framing square 1 is prevented from sliding within horizontal slot 8 into which it is inserted. To fix the position of framing square 1, horizontal positioners 11 are forced into contact with framing square 1, thereby causing framing square 1 to come into contact with the inner wall of horizontal slot 8. As with vertical scale 7, the constant application of force from horizontal positioners 11 on framing square 1, coupled with the friction between framing square 1 and the inner wall of horizontal slot 8 prevents framing square 1 from sliding relative to horizontal slot 8. FIG. 2a illustrates an upper view of body 12 showing front plate 13. As depicted, horizontal positioners 11 are located directly above horizontal slots 8. Horizontal positioners 11 may include any conventional means of applying force to framing square 1. In the illustrated embodiment, horizontal positioners 11 are thumb screws which threadedly engage positioner holes 23. Although the illustrated embodiment of square block assembly 6 includes two horizontal slots 8, other embodiments may include only one horizontal slot 8 or more than two horizontal slots 8. In such cases, horizontal slot 8 would either be sized to accommodate the anticipated size of the framing square or other positioning device.

Compass assembly 26, as depicted in FIG. 1, is adaptable for slidably engaging a reference tool and includes the basic elements of a body 27 and a protractor assembly 35. Protractor assembly 35 may comprise any means for determining angles. The protractor assembly 35 in the embodiment illustrated in FIG. 1 comprises a compass extension 36 rotably connected to body 27. A body 27 is defined as any type of housing capable of slidably engaging a reference tool and having compass extension 35 rotably connected thereto.

FIGS. 3a–3d illustrate various views of one embodiment of compass assembly 26. In the embodiment of compass assembly 26 illustrated in FIG. 3d, body 27 has a two piece construction. Body 27 is comprised of front plate 32 and back plate 33. Back plate 33 is generally rectangular and includes circular end 45. Back plate 33 has three horizontally positioned rails 42, and the spaces between horizontal rails 42 define two channels 46. Similar to square block assembly 6, the illustrated embodiment of compass body 27 includes narrow horizontal channel 43 and wide horizontal channel 44 to accommodate the narrow side 2 and wide side 3, respectively, of framing square 1 (FIG. 1). Front plate 32 is generally rectangular. In the illustrated embodiment, front and back plates 32,33 are fabricated from extruded aluminum and channels 46 are machined from back plate 33. In an alternate embodiment of compass assembly 26, front and back plates 32, 33 may be fabricated through a conventional injection molding process wherein molds are first created for front and back plates 32, 33 and material is then injected into the molds to form the plates.

Figure 3A:
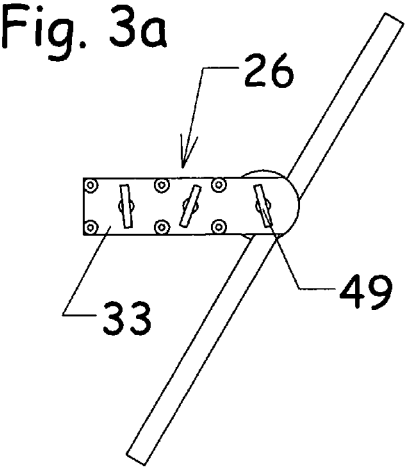
FIG. 3a is a back view of one embodiment of the compass assembly.
Figure 3B:
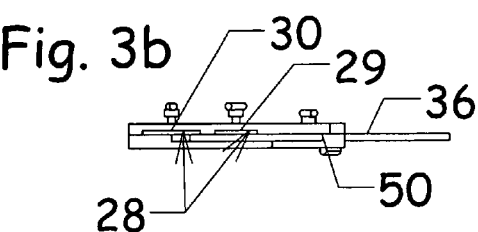

Front plate 32 and back plate 33 are connected together using screws 15 inserted in screw holes 22. When front plate 32 and back plate 33 are connected together, front plate 32 covers channels 46, thereby transforming channels 46 into horizontal slots 28 as depicted in FIG. 3b. Narrow horizontal channel 43 is converted into narrow horizontal slot 29 and wide horizontal channel 44 is converted into wide horizontal slot 30.

Figure 3C:
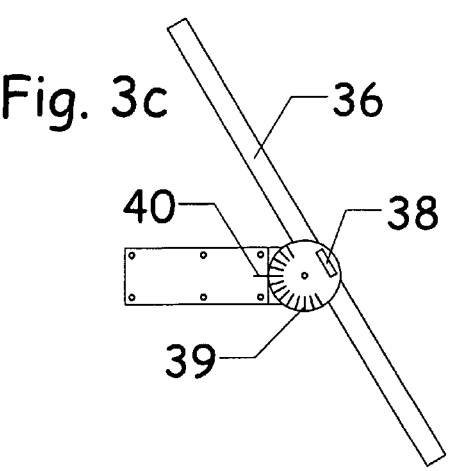
Figure 3D:
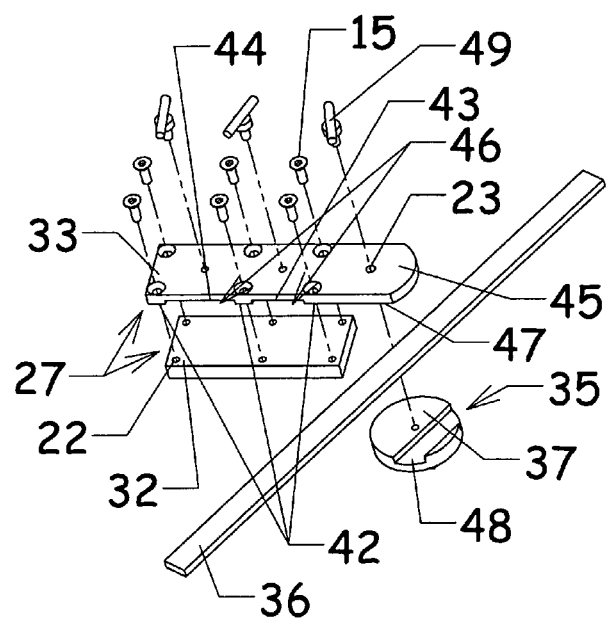

Turning now to FIG. 3d, positioner holes 23 are located on back plate 33 above horizontal channels 28. Horizontal positioners 49 extend through positioner holes 23 and are designed to engage framing square 1. Horizontal positioners 49 are capable of fixing the position of framing square 1 relative to horizontal slot 28 such that framing square 1 is prevented from sliding within horizontal slot 28. As described above, to fix the position of framing square 1, horizontal positioners 49 are forced into contact with framing square 1, thereby causing framing square 1 to come into contact with the inner wall of horizontal slot 28 and be securely gripped therein. FIG. 3a illustrates a back view of compass assembly 26 showing back plate 33. As depicted, horizontal positioners 49 are located directly above horizontal slots 28. Horizontal positioners 49 include any conventional means of applying force to framing square 1, including thumb screws which threadedly engage positioner holes. Although the illustrated embodiment of compass assembly 26 includes two horizontal slots 28, other embodiments may include only one or more than two horizontal slots 28 sized to accommodate any particular framing device.

In the embodiment illustrated in FIG. 3d, back plate 33 is longer than front plate 32. Front plate 32 covers a portion of back plate 33 when the two plates are assembled together. That portion of back plate 33 which is not covered by front plate 32 is connector site 47. Connector site 47 is the general location where protractor assembly 35 connects to body 27. Protractor assembly 35 comprises rotating member 37 and compass extension 36. Rotating member 37 includes extension channel which is sized to permit compass extension 36 to slide inside extension channel 48. In assembling compass assembly 26, compass extension 36 is positioned within arm channel 48. Rotating member 37 is then connected to back plate 33 at the connector site 47 using rotation positioner 49 inserted through positioner hole 23. Rotation positioner 49 provides a central axis point about which rotating member 37 and compass extension 36 can rotate until positioner 49 is completely tightened. When rotating member 37 is connected to back plate 33, back plate 33 covers extension channel 48, thereby transforming extension channel 48 into extension slot 50 (shown on FIG. 3b). Extension channel 48 is sized such that the complete tightening of rotation positioner 49 also acts to fix compass extension 36 into place and prevent its movement in extension channel 48.

As seen in FIG. 3c, the side of rotating member 37 opposite of extension channel 48 includes graduation markings 39. Front plate 32 includes reference mark 40. Reference mark 40 is any mark which is used to line up the corresponding markings 39 on rotating member 37. In the embodiment illustrated, reference mark 40 and markings 39 are straight lines. In preferred embodiments of the invention, markings 39 are measurement units such as degrees or radians for indicating angle measurements. In the illustrated embodiment, rotating member 37 also includes level 38 which may be a conventional bubble level as is well known within the art. Level 38 is fixedly positioned on rotating member 37 and oriented along the same longitudinal axis as compass extension 36. Level 38 maintains its position relative to compass extension 36 when rotating member 37 is rotated in either direction. As a result, compass extension 36 used in combination with level 38 can function as a conventional leveling device.

FIG. 4 illustrates a configuration for, and method of, using the aligning device for aligning flange 52 ninety degrees in reference to the top longitudinal axis of a pipe 51. To accomplish the aforementioned task, the illustrated embodiment of the aligning device comprises two square block assemblies 6 used in combination with framing square 1. Square block assemblies 6 are positioned on wide side 3 of framing square 1. The aligning device is placed dead center on the top of pipe 51 with narrow side 2 of framing square 1 facing in a downward direction. As illustrated, each vertical scale 7 is then adjusted to the same height. Setting both vertical scales 7 to the same height is necessary for aligning flange 52 at a ninety degree angle relative to the longitudinal axis of pipe 51. The height at which vertical scales 7 are set should be sufficient to permit clearance between framing square 1 and the top of flange 52. With square block assemblies 6 positioned on the top of pipe 51, narrow side 2 of framing square 1 is positioned against flange 52. Flange 52 is then positioned so that it aligns flush with narrow side 2 of framing square 1 and is then welded onto pipe 51.

Figure 5:
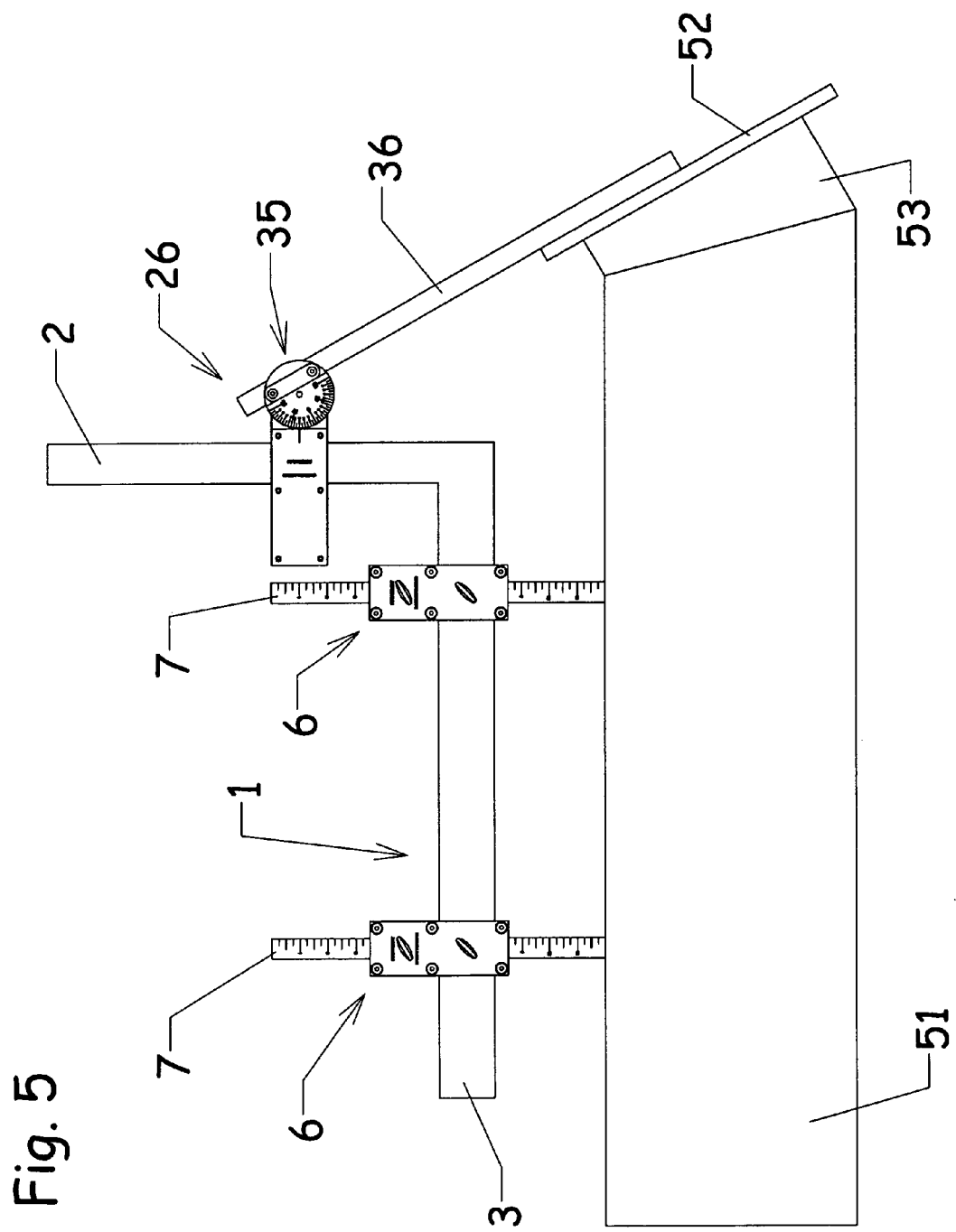
FIG. 5 illustrates another embodiment of the aligning device positioned on a pipe.

FIG. 5 illustrates a configuration for, and method of, using the aligning device for aligning elbow joint 53 and flange 52 at a specific degree of offset angle in reference to pipe 51. The illustrated aligning device includes two square block assemblies 6 and compass assembly 26 used in combination with framing square 1. As shown, two square block assemblies 6 are positioned on wide side 3 of framing square 1. Compass assembly 26 is positioned on narrow end 2 of framing square 1. The aligning device is positioned top dead center on pipe 51 with narrow end 2 of framing square 1 pointing in an upward direction. Each vertical scale 7 is then adjusted to the same height and protractor assembly 35 is set to a desired angle. In attaching elbow joint 53 to pipe 1, compass extension 36 is positioned flush against the outside mouth of elbow joint 53. Once elbow joint 53 is positioned flush with compass extension 36, elbow joint 53 can be welded to pipe 51. Likewise, in connecting flange 52 to elbow joint 53, flange 52 is positioned flush against compass extension 36 and then welded in place. In the above described method, protractor assembly 35 is set at a known, predetermined angle (i.e. thirty degrees). As will be discussed below, the aligning device can also be used as a tool for determining unknown angles of existing pipes and then using those angles to construct a new pipe having the same angles as the measured existing pipe.

Figure 6:
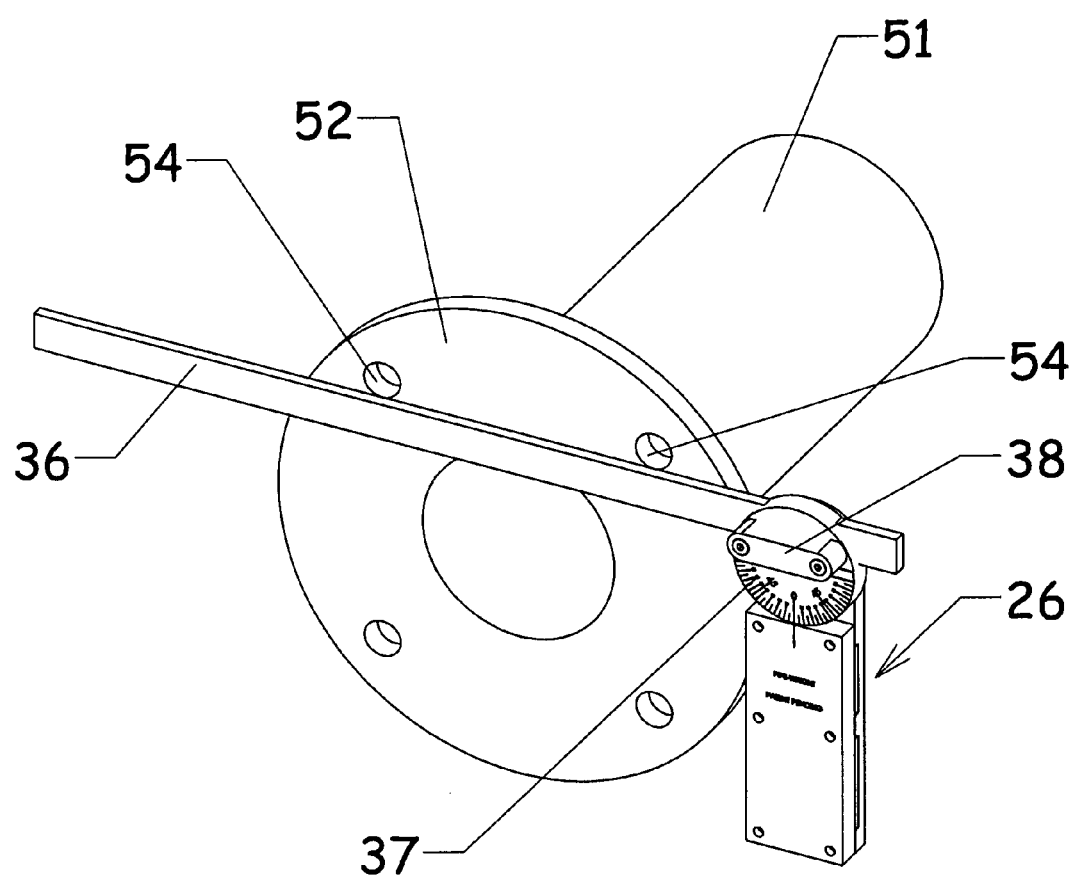
FIG. 6 is a perspective view depicting the method of two-hole leveling.

FIG. 6 illustrates a method of using compass assembly 26 to two-hole level flange 52 to pipe 51. "Two-hole leveling" refers to leveling eyes 54 of flange 52 when attaching flange 52 to pipe 51. Compass extension 36 is positioned across eyes 54. Compass extension 36 should be positioned at the same point relative to each eye 54 in order to properly level them. For instance, in the illustrated embodiment, compass extension 36 is positioned directly beneath each eye 54. However, compass extension 36 could also be positioned directly above eyes 54. Once compass extension 36 is positioned across eyes 54, level 38 is used as a reference to level eyes 54. In the illustrated embodiment, level 38 is a conventional bubble level comprising a liquid filled capsule having an air bubble. As previously mentioned, level 38 is fixedly positioned along the same longitudinal axis as compass extension 36. In order to level eyes 54, flange 52 is rotated clockwise or counterclockwise with compass extension 36 held in position until such point the air bubble is centered in the capsule, thus indicating eyes 54 are level.

Figure 7:
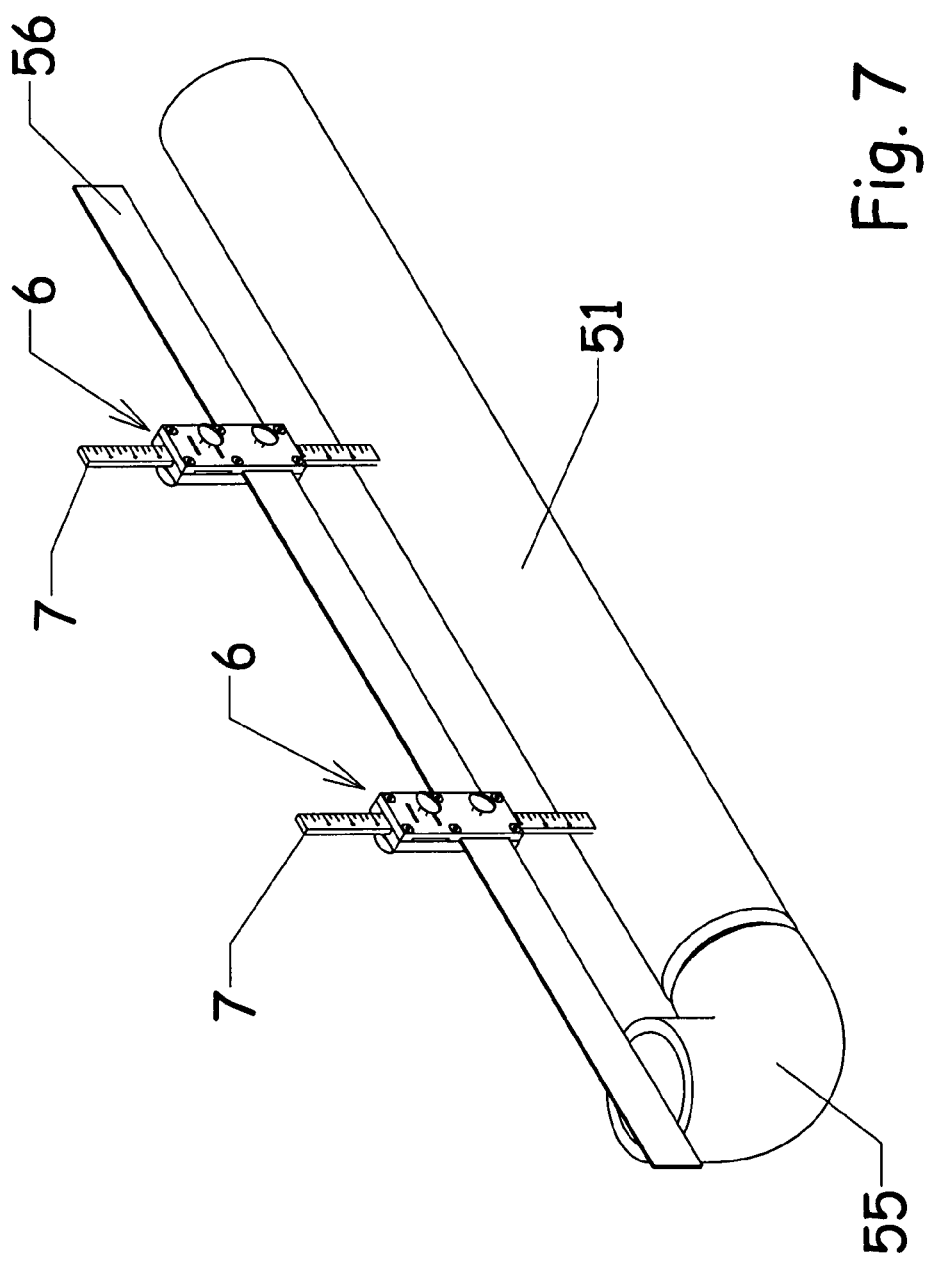
FIG. 7 is a perspective view of another embodiment of aligning device positioned on a pipe.

FIG. 7 illustrates a configuration for, and method of, using the aligning device for fitting a ninety degree angle joint 55 to pipe 51. The illustrated embodiment of the aligning device comprises two square block assemblies 6 used in combination with straight stick 56. As an example, straight stick 56 may be a conventional meter stick. As shown, square block assemblies 6 are positioned on straight stick 56. When positioned on straight stick 56, square block assemblies 6 are placed a sufficient distance apart from one another to increase the stability of the aligning device. The aligning device is then centered on top of pipe 51 as seen in FIG. 7. Next, right angle joint 55 is tack welded onto pipe 51. Vertical scales 7 of vertical assemblies 6 are each adjusted to the same height. The height should permit the bottom edge of straight stick 56 to lightly rest across the upper mouth of right angle joint 55. When the aligning device is positioned on pipe 51, and vertical scales 7 are adjusted to equal heights, straight stick 56 runs parallel to the horizontal axis of pipe 51. Adjusting the mouth end of right angle joint 55 to be in line with the bottom edge of straight stick 56 results in the mouth of right angle joint 55 being oriented exactly perpendicular to the horizontal axis of pipe 51. Although the illustrated embodiment uses straight stick 56, a framing square as described above may also be used in combination with two square block assemblies to accomplish alignment of right angle joint 55.

Figure 8:
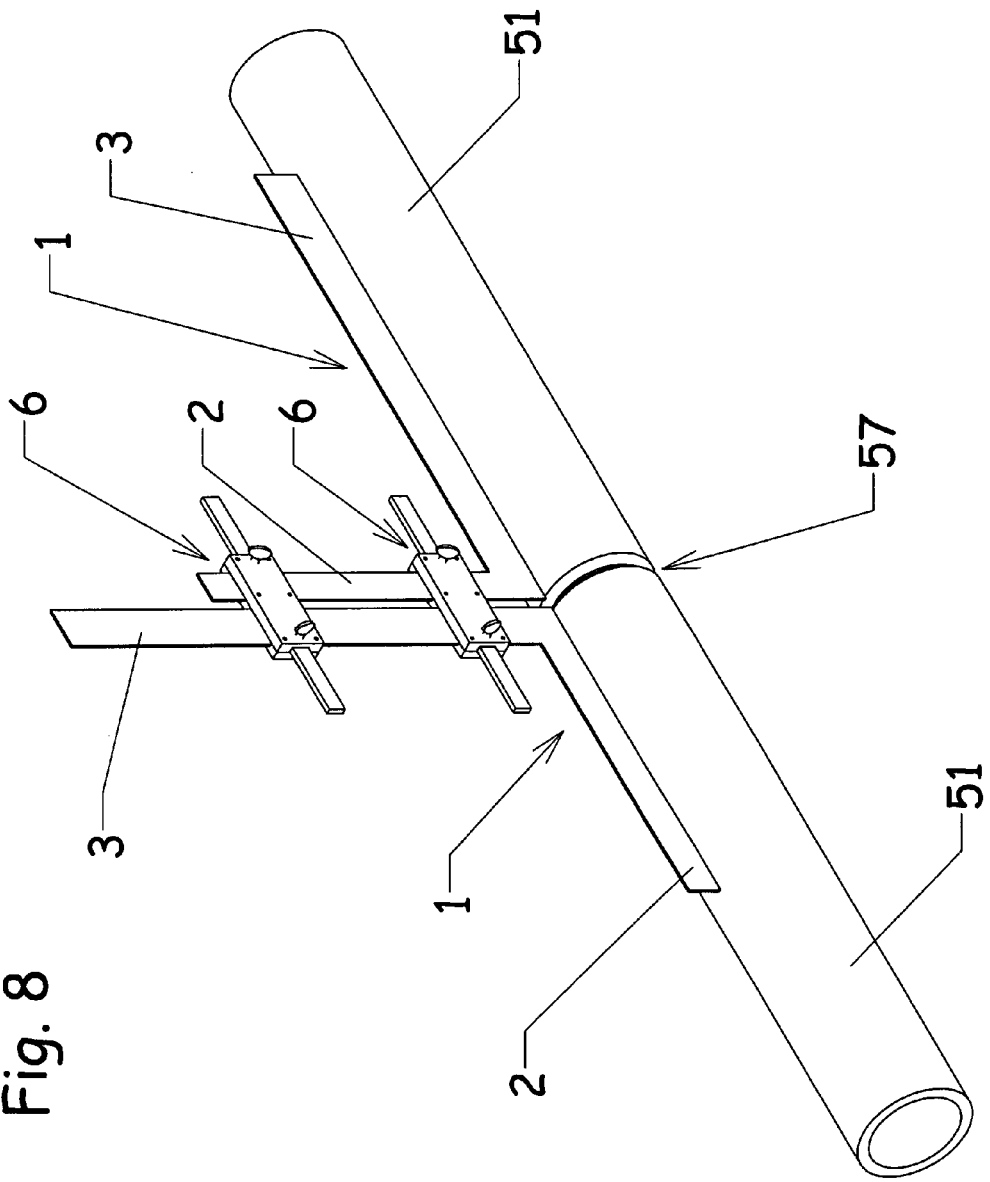
FIG. 8 is a perspective view of another embodiment of the aligning device positioned on a pipe.

FIG. 8 illustrates a configuration for, and method of using the aligning device to orient and join two pieces of pipe 51 along a one hundred eighty degree longitudinal axis. The illustrated aligning device comprises two square block assemblies 6 used in combination with two framing squares 1. To configure the aligning device, wide side 3 of one framing square 1 is connected to narrow side 2 of another framing square 1 using two square block assemblies 6. Wide side 3 of the first framing square 1 will insert into wide horizontal slots 30 of both square block assemblies, while narrow side 2 of the second framing square 1 will insert into narrow horizontal slots 29 of the other framing square 1. In this configuration, the bottom edges of framing squares 1 form a straight line. The aligning device is centered on top of pipe 51 as illustrated in FIG. 8 wherein the gap between the two framing squares is positioned directly over joint 57. With two pipes 51 positioned along the same horizontal axis as the bottom edge of the aligning device, the pipes 51 may be welded together in precise 180° orientation.

Figure 9:
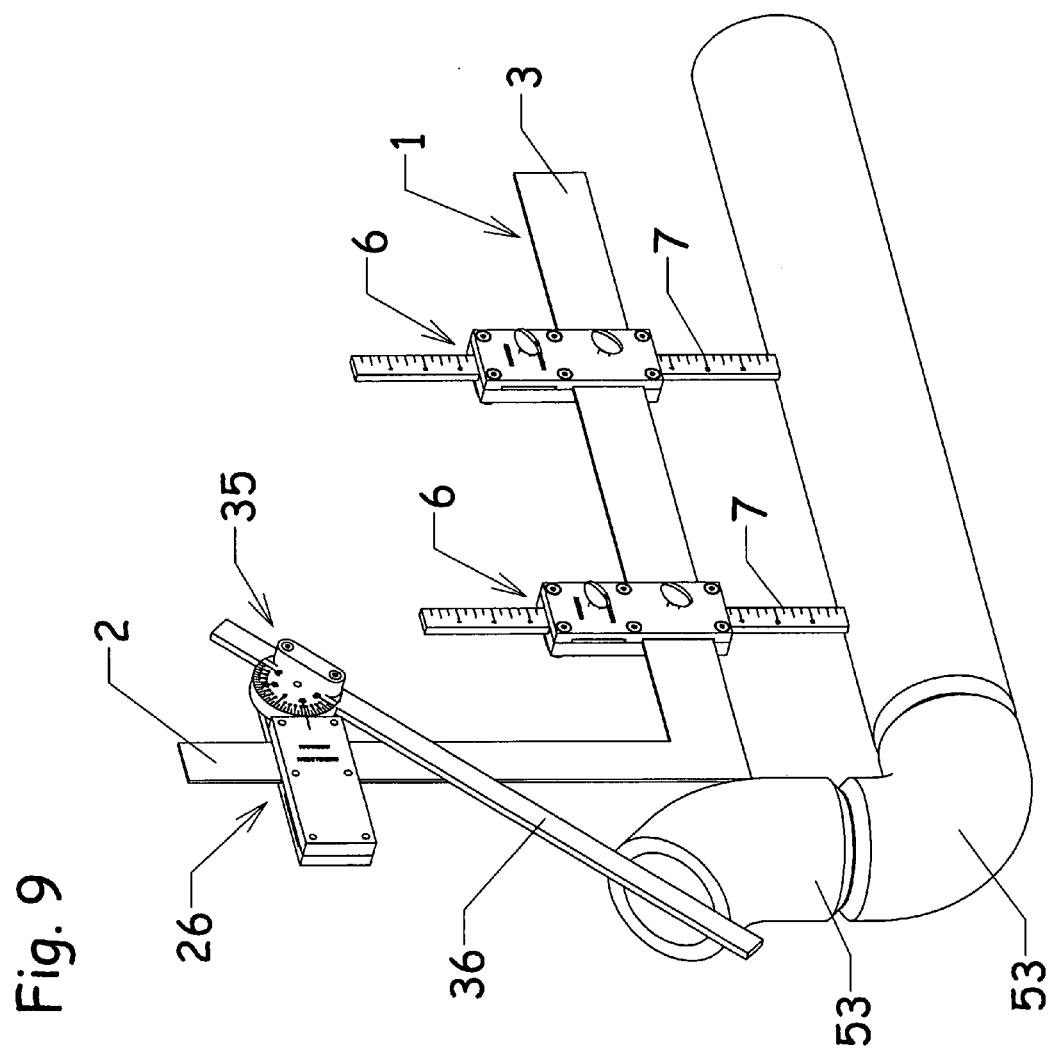
FIG. 9 is an illustration of another use of the aligning device.

FIG. 9 illustrates a configuration for, and method of, using the aligning device to align a compound joint, consisting of two elbow joints 53 welded together. The illustrated aligning device consists of two square block assemblies 6 and a compass assembly 26 used in combination with a framing square 1. The two square assemblies are positioned on wide side 3 of framing square 1 and compass assembly 26 is positioned on narrow side 2 of framing square 1. The aligning device is then positioned top dead center on pipe 51 and vertical scales 7 are set to equal heights. Protractor assembly 35 is then set to the desired angle. The open mouth end of elbow joint 53 is positioned flush against compass extension 36 thereby aligning elbow 53 to have the desired angle relative to the horizontal axis of pipe 51. The illustrated aligning device can of course be used to set the angles of compound joints consisting of more than two elbow joints.

Figure 10:
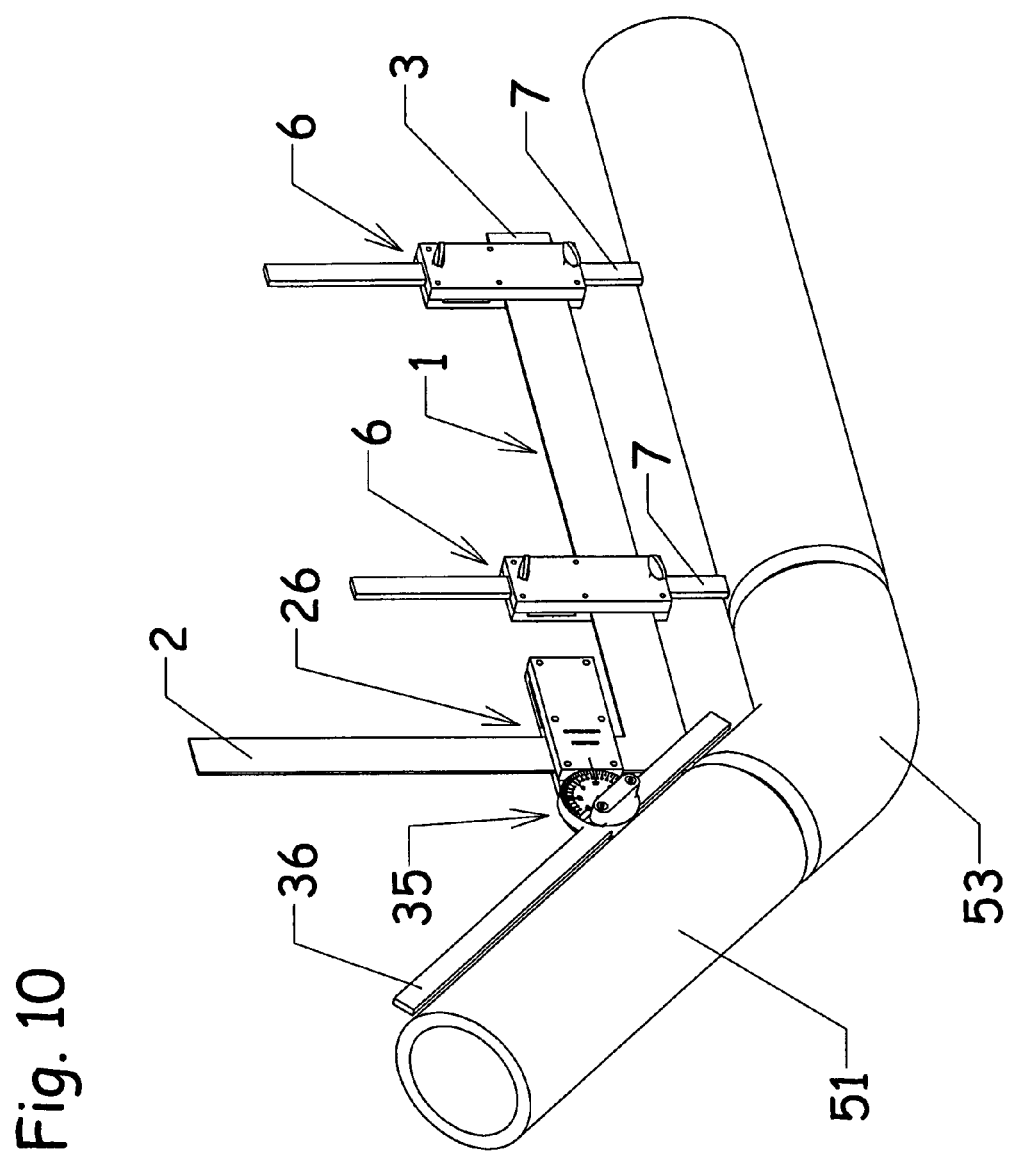
FIG. 10 is an illustration of another use of the aligning device.

FIG. 10 illustrates the aligning device being used to connect a straight piece of pipe 51 to an elbow joint 53. The two square block assemblies are positioned on wide side 3 of framing square 1 and compass assembly 26 is positioned on narrow side 2 of framing square 1. Narrow side 2 of framing square 1 is oriented in an upward direction. As illustrated, compass assembly 26 is positioned near the right angle of framing square 1. The aligning device is positioned top dead center on pipe 51 and the vertical scales 7 are set to equal heights. Rotating member 37 of protractor assembly 35 is set to the point where compass extension 36 runs parallel to the angle of elbow joint 53. Pipe 51 is positioned along the same longitudinal axis as compass extension 36 and then welded to elbow joint 53.

Figure 11:
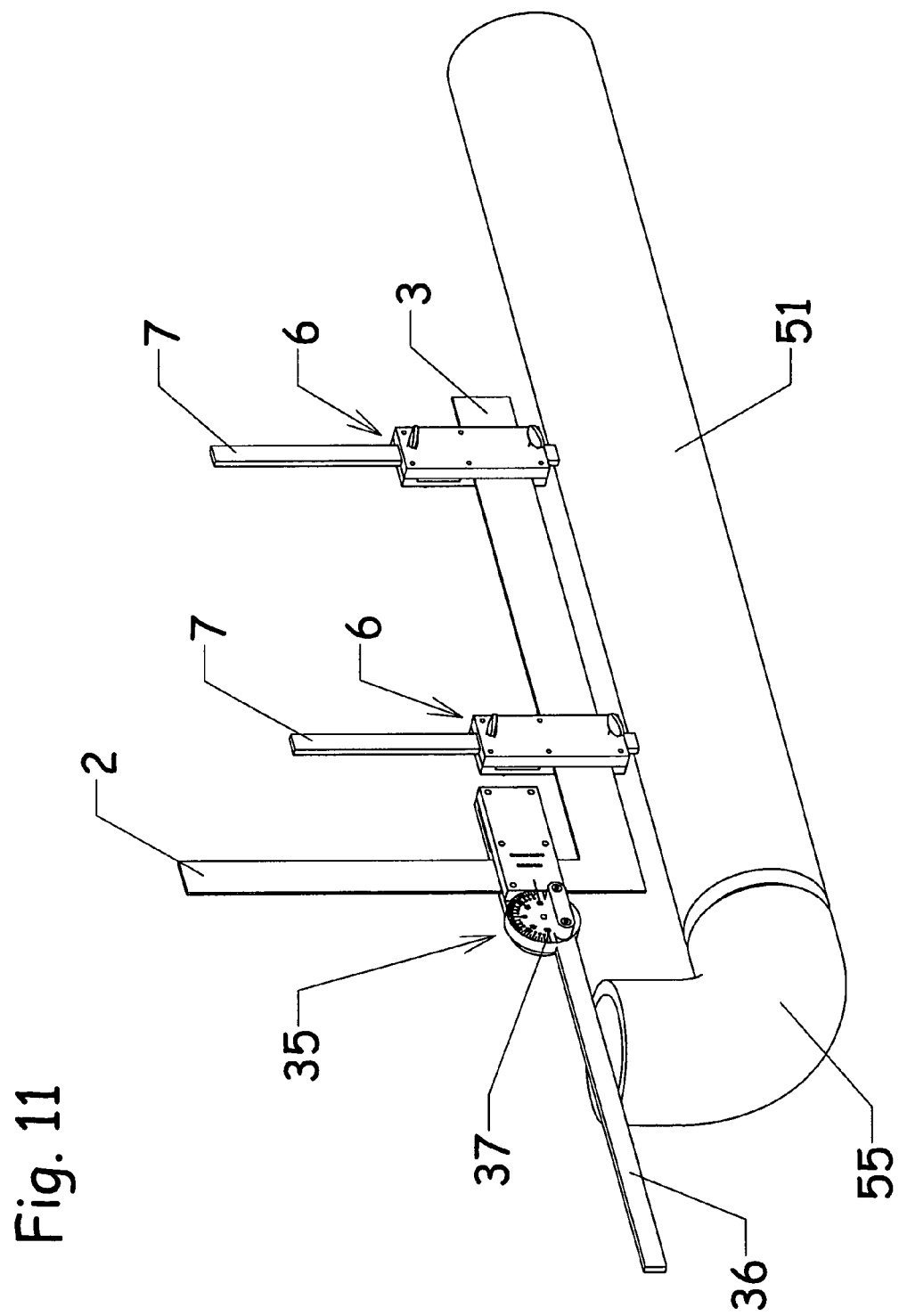
FIG. 11 is an illustration of another use of the aligning device.

FIG. 11 illustrates another method of using the aligning device to align a right angle joint 55. Rather than the method shown in FIG. 7, the embodiment of FIG. 11 illustrates the aligning device comprising two square block assemblies 6 and a compass assembly 26 used in combination with a framing square 1. The two square block assemblies 6 are positioned on wide side 3 of framing square 1 and compass assembly 26 is positioned on narrow side 2 of framing square 1. The aligning device is positioned top dead center on pipe 51 and the vertical scales 7 are set to equal heights. Rotating member 37 of protractor assembly 35 is positioned so that compass extension 26 is along the same horizontal axis as pipe 51. The height of vertical scales 7 is adjusted so that compass extension 36 is positioned across the open mouth of right angle joint 55. The open mouth of right angle joint 55 is then adjusted flush with the bottom edge of compass extension 36 and welded in place.

Figure 12:
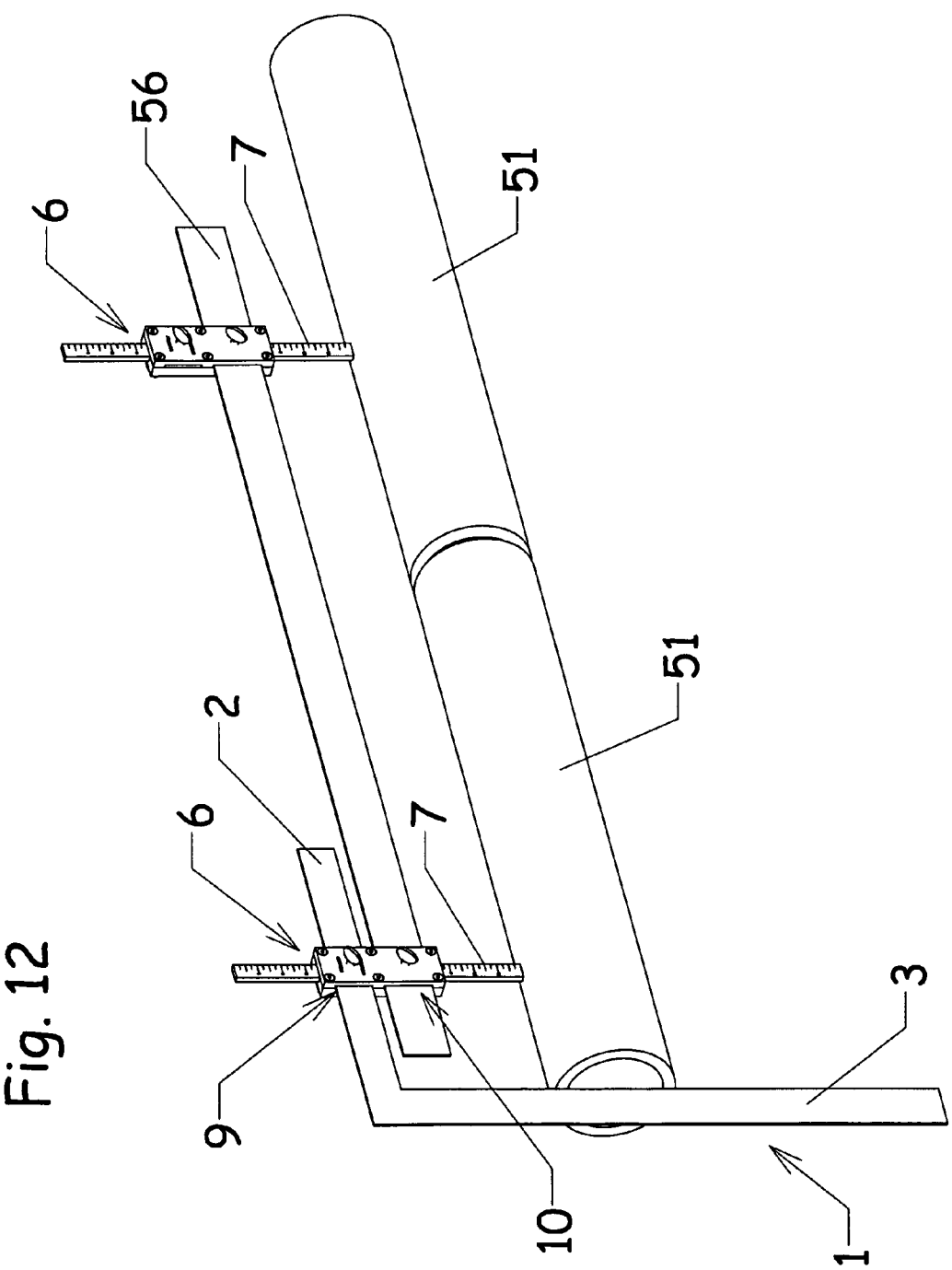
FIG. 12 is an illustration of another use of the aligning device.

FIG. 12 illustrates a still further method of using the aligning device to connect two pieces of pipe 51. The illustrated embodiment of the aligning device comprises at least one square block assembly 6 combined with a framing square 1 and a straight stick 56. Narrow side 2 of framing square 1 is inserted in narrow horizontal slot 9 of vertical scale 6. Wide side 3 of framing square 1 is oriented in a downward direction. Straight stick 56 is inserted in wide horizontal slot 10 of square block assembly 6. A second square block assembly 6, although not seen in FIG. 12, may be added to the end of straight stick 56 to help stabilize the aligning device. The aligning device is then positioned top dead center on pipe 51 and vertical scales 7 are set to equal heights. As shown, wide end 3 of framing square 1 is positioned against the open mouth end of pipe 51. When the open mouth end of pipe 51 is flush with the wide side 3 of framing square 1, then the two adjacent pieces of pipe 51 are in line on the same horizontal axis and may be welded together.

In some of the above described methods for using various embodiments of the aligning device, the protractor assembly 35 is positioned to a desired angle such as thirty degrees, forty-five degrees, or ninety degrees. Setting the protractor assembly 35 to a predetermined angle is useful when the desired angle to be achieved is known in advance. However, oftentimes new pipes are constructed parallel to existing pipes within interiors of factories, mills, shops, etc., and the angles of the existing pipes are unknown. In order to run the new pipe parallel to the existing pipe, the angles of the existing pipe must first be determined so that the new pipe can be constructed using the same angles as the existing pipe. Various configurations of the aligning device may be used to determine the angles of the existing pipe. One configuration for determining the angles of existing pipes and pipe joints is the configuration illustrated in FIG. 5. Viewing FIG. 5, if pipe 51 were an existing pipe, the aligning device would be positioned dead center on pipe 51 as illustrated and vertical scales 7 would be set to equal heights. Compass extension 36 of compass assembly 26 would be rotated to a point where the edge of compass extension 36 lies flush on the outer lip of flange 52. Using rotating positioner 49, compass extension 36 is locked in place at the angle of the existing pipe. The aligning device is then lifted from the existing pipe 51 and placed on the new pipe that is being constructed. A new joint can then be set on the new pipe using the angle locked in on the aligning device. The configuration in FIG. 5 is used as an example of configuring the aligning device to determine angles of existing pipes. Other configurations of the aligning device may be used for deducing the angles of existing pipes, and then those angles may be transferred to new piping designed to run parallel to the existing pipe.

FIGS. 13a and 13b illustrate two different embodiments of base assembly 65. An alternate embodiment of the aligning device will further comprise a base assembly 65 for the purpose of supporting the aligning device on a piece of pipe. Turning now to FIG. 13a, the base assembly 65 comprises a body 70 having a top 68 and a bottom 71. A receiving slot 69 is positioned at the top 68 of body 70. In the embodiment illustrated in FIG. 13a, body 70 further comprises a generally triangular shaped plate 67 on both sides with a magnetic material 66 positioned between plates 67. The receiving slot 69 will be sufficiently sized to allow a vertical scale 7 of the square block assembly 6 (illustrated in FIG. 2d) to slide in and out of receiving slot 69. Positioner 73 is located over receiving slot 69 and is capable of engaging vertical scale 7 when vertical scale 7 is positioned within slot 69. Positioner 73 functions the same as vertical positioner 21 illustrated in FIG. 2d and discussed above.

FIG. 13b illustrates another embodiment of base assembly 65. That embodiment of base assembly 65 comprises a body 70 having a top 68 and a bottom 71. Like the embodiment discussed in FIG. 13a, the embodiment of base assembly 65 illustrated in FIG. 13b also includes receiving slot 69 positioned at the top 68 of body 70. Receiving slot 69 shown in the embodiment illustrated in FIG. 13*b* functions the same as the receiving slot 69 discussed in FIG. 13*a*. As illustrated in FIG. 13*b*, bottom 71 characterized by a v-notch 72. The v-notch assists in stabilizing the aligning device on the curved surface of a piece of pipe. The embodiment of base assembly 65 illustrated in FIG. 13*b* also includes positioner 73 which functions the same as positioner 73 illustrated in FIG. 13*a*.

Figure 14:
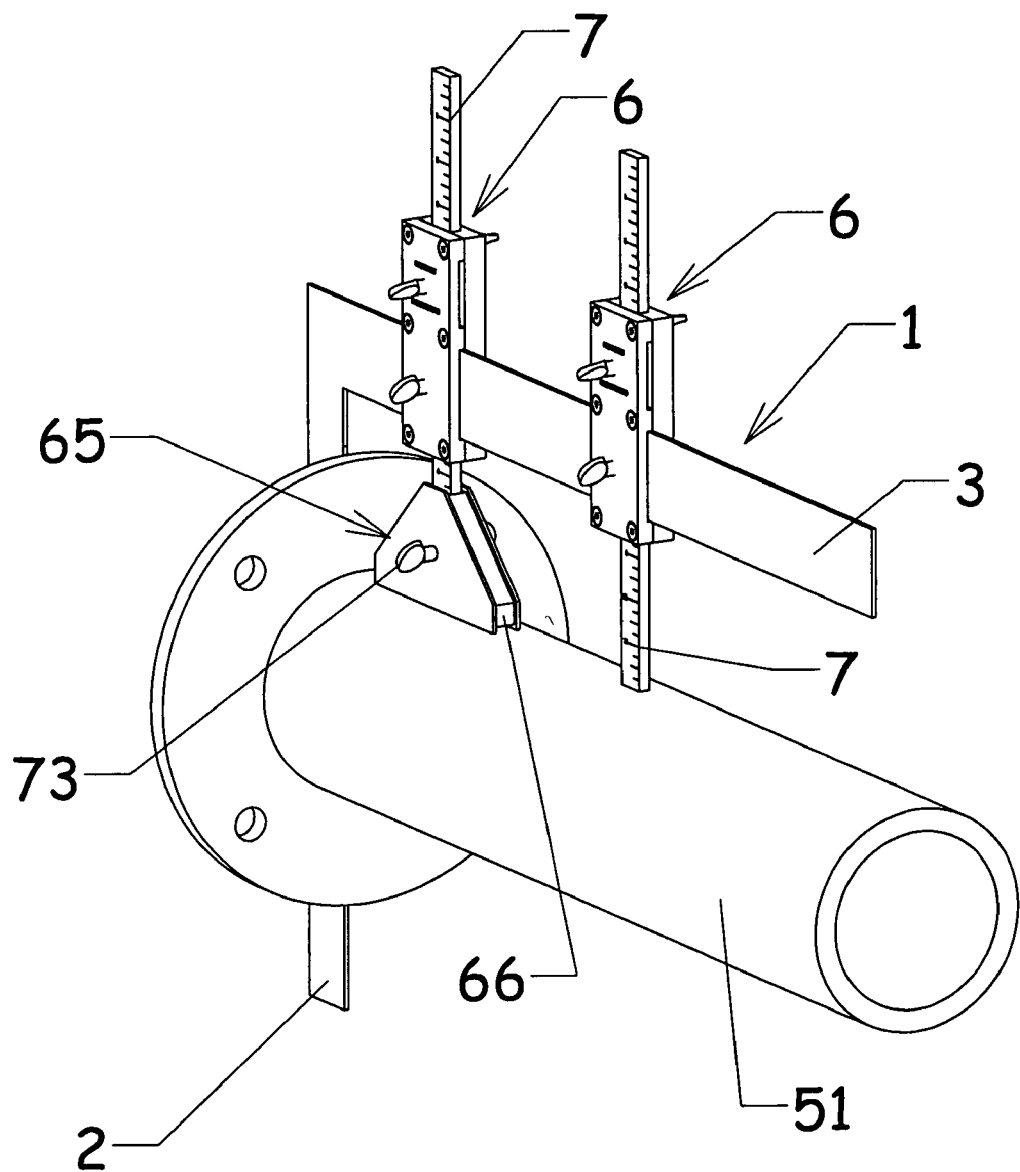
FIG. 14 is a perspective view of another embodiment of the aligning device having a base assembly.

As best seen in FIG. 14, in use, the vertical scales 7 of square block assemblies 6 are positioned within receiving slot 69 of base assembly 65. Positioner 73 is then positioned against vertical scale 7 to prevent vertical scale 7 from sliding out of receiving slot 69. The bottom 71 of base assembly 65 is then positioned on the particular piece of pipe being measured. If the embodiment of base assembly 65 illustrated in FIG. 13*a* is used, the magnetic material 66 will be attracted to the metallic properties of the piece of pipe thus holding the base assembly 65 is contact with the piece of pipe. If the embodiment of base assembly 65 illustrated in FIG. 13*b* is used, the v-notch 72 of body 70 will help maintain the base assembly 65 on top dead center of a piece of pipe. Other embodiments of the aligning device may include more than one base assembly 65. For instance, an aligning device having two square block assemblies 6 may also have two base assemblies 65, wherein each vertical scale 7 of a square block assembly 6 would be positioned in a base assembly 65.

Although the above disclosure illustrates a few preferred embodiments of the present invention, those skilled in the art will recognize many variations and modifications of the present invention. For example, as used herein, vertical scale assemblies and compass assemblies may both generally be referred to as "fixtures". Additionally, the term "aligning device" is synonymous with "Pipe Wright"; the term "protractor assembly" is synonymous with the term "angle device"; and the term "compass extension" is synonymous with the term "arm". Likewise, the term "reference tool" may be a framing square, meter/yard stick, or any other device for aligning, spacing, or mounting the square block assemblies and/or compass assembly.

As further examples, the invention includes a method of using an aligning device to attach two straight pieces of pipe along a straight horizontal axis. The aligning device comprises two reference tools joined together by at least two square block assemblies and the method comprises the steps of: a) positioning said aligning device top dead center over the joint between both said pipes; b) aligning both of said pipes flush with the bottom of said aligning device; and c) welding said pipes together. The invention also includes a method of using an aligning device to determine the angles of an existing pipe and then using those angles to construct a new pipe having the same angles as the existing pipe. The aligning device comprises a reference tool, at least two square block assemblies and a compass assembly. The method comprises the steps of: a) positioning said aligning device top dead center on said existing pipe near the unknown angle to be measured; b) setting square block assemblies to the same height; c) adjusting a protractor assembly of said compass assembly to deduce the unknown angle of said existing pipe; d) locking the position of said compass assembly once said unknown angle has been deduced; and e) placing said aligning device on said new pipe and welding additional pipe at an angle in accordance with the locked position on said compass assembly.

The above and all other such modifications and variations should be considered as coming within the scope of the following claims.

I claim:

1. An aligning device, comprising at least two square block assemblies slidably positioned on a framing square, each of said square block assemblies further comprising:
    a. a slot with a vertical scale extending therefrom; and
    b. a narrow horizontal slot and a wide horizontal slot for slidably engaging said framing square, said narrow horizontal slot being sized to fit a narrow side of said framing square, and said wide horizontal slot being sized to fit a wide side of said framing square.

2. The aligning device in claim 1, further comprising at least one compass assembly slidably positioned on said framing square.

3. The aligning device in claim 2, wherein said compass assembly further comprises a narrow horizontal slot and a wide horizontal slot, wherein said narrow horizontal slot is sized to fit a narrow side of said framing square, and said wide horizontal slot is sized to fit a wide side of said framing square.

4. The aligning device in claim 1, further comprising at least one base assembly positioned on one of said square block assemblies.

5. The aligning device in claim 4, wherein said base assembly further comprises a magnet.

6. The aligning device in claim 4, wherein said base assembly further comprises a bottom having a v-notch.

7. An aligning device, comprising:
    at least one square block assembly having a horizontal slot with a reference tool extending therethrough, said square block assembly further having a vertical slot extending therethrough with a vertical scale extending from said vertical slot; and
    at least one compass assembly slidably positioned on said reference tool and spaced apart from said square block assembly.

8. A method of using an aligning device to attach a joint or flange to a desired angle of offset relative to the horizontal axis of the top of a piece of pipe, said aligning device comprising i) a reference tool, ii) at least two square block assemblies, each square block assembly comprising a horizontal slot for engaging said reference tool and a vertical slot for engaging a vertical scale, and iii) a separate compass assembly comprising a protractor assembly, compass extension, and a slot for engaging said reference tool, said method comprising the steps of:
    positioning said aligning device on said pipe;
    adjusting the height of said aligning device and fixing said vertical scales against movement in said vertical slots;
    positioning said protractor assembly to a desired angle;
    positioning the mouth of said joint or flange flush with said compass extension; and
    welding said joint or flange to said pipe.

9. A square block assembly adaptable for engagement with a reference tool, comprising:
    a. a body comprising
        i. a first plate having a horizontal slot formed therethrough; and
        ii. a second plate having a vertical slot formed therethrough;
    b. at least one horizontal positioner connected to said body for adjustably fixing the position of a reference tool within said horizontal slot; and c. at least one vertical positioner connected to said body for adjustably fixing the position of a vertical scale within said vertical slot.

10. The square block assembly in claim 9, further comprising a second horizontal slot wherein said horizontal slots comprise a narrow horizontal slot and a wide horizontal slot for slidably engaging a reference tool having two sides of different widths, wherein said narrow horizontal slot is sized to fit a narrow side of said reference tool, and said wide horizontal slot is sized to fit a wide side of said reference tool.

11. The square block assembly in claim 10, wherein said first plate includes at least three horizontal rails and at least two horizontal channels and said second plate includes at least two vertical rails and at least one vertical channel.

12. The square block assembly in claim 9, further comprising a vertical scale including markings positioned along a longitudinal length of said vertical scale.

13. The square block assembly in claim 12, wherein a reference tool engages said horizontal slot.

14. A compass assembly adaptable for engagement with a reference tool, comprising:
- an elongated body having at least one horizontal slot, wherein said horizontal slot is sized so that said reference tool can slide within said horizontal slot;
- at least one horizontal positioner connected to said elongated body for adjustably fixing the position of said reference tool within said horizontal slot; and
- a protractor assembly rotatably connected to said elongated body, said protractor assembly further comprising a rotating member having a channel sized to allow a compass extension can slide within said channel.

15. The compass assembly in claim 14, wherein said elongated body further comprises a narrow horizontal slot and a wide horizontal slot for slidably engaging a reference tool having two sides of different widths, wherein said narrow horizontal slot is sized to fit a narrow side of said reference tool, and said wide horizontal slot is sized to fit a wide side of said reference tool.

16. The compass assembly in claim 15, wherein said elongated body further comprises a front plate and a back plate, wherein said back plate includes at least two horizontal rails, at least one horizontal channel, and a connector site for attaching said protractor assembly.

17. The compass assembly in claim 16, wherein said front plate further comprises a reference mark said rotating member further comprises a plurality of markings.

18. The compass assembly in claim 14, wherein said elongated body further comprises a front plate and a back plate, wherein said back plate includes at least two horizontal rails, at least one horizontal channel, and a connector site for attaching said protractor assembly.

19. The compass assembly in claim 14, wherein said protractor assembly further comprises a level.

20. A square block assembly adaptable for engagement with a reference tool, comprising:
a. a body comprising a first plate and a second plate;
b. at least one horizontal slot for engaging a reference tool formed in said first plate; and
c. at least one vertical slot formed in said body second plate and having a positioner engaging said vertical slot for adjustably fixing the position of a vertical scale within said vertical slot.

\* \* \* \* \*